US007746441B2

(12) United States Patent
Song et al.

(10) Patent No.: US 7,746,441 B2
(45) Date of Patent: Jun. 29, 2010

(54) SPACER POSITIONING TO IMPROVE DISPLAY QUALITY IN A LIQUID CRYSTAL DISPLAY APPARATUS

(75) Inventors: Jun-Ho Song, Seongnam-si (KR); Yong-Ho Yang, Seoul (KR); Ji-Hye Moon, Seoul (KR); Jin-Suk Park, Seoul (KR); Kyo-Seop Choo, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 130 days.

(21) Appl. No.: 11/031,122

(22) Filed: Jan. 5, 2005

(65) Prior Publication Data
US 2005/0146661 A1    Jul. 7, 2005

(30) Foreign Application Priority Data
Jan. 6, 2004    (KR)    ...................... 10-2004-0000524

(51) Int. Cl.
*G02F 1/1339*    (2006.01)
(52) U.S. Cl. ........................ 349/155; 349/153
(58) Field of Classification Search ................ 349/114, 349/155, 126, 153
See application file for complete search history.

(56) References Cited

U.S. PATENT DOCUMENTS

| 6,304,308 | B1* | 10/2001 | Saito et al. ................... 349/155 |
| 6,847,426 | B2* | 1/2005 | Fujimori et al. .............. 349/113 |
| 2002/0051112 | A1* | 5/2002 | Katsura ..................... 349/153 |
| 2003/0117551 | A1 | 6/2003 | Fujimori et al. |
| 2003/0193640 | A1* | 10/2003 | Park et al. .................... 349/155 |
| 2004/0080694 | A1* | 4/2004 | Konuma ..................... 349/123 |

\* cited by examiner

*Primary Examiner*—David Nelms
*Assistant Examiner*—Nathanael R Briggs
(74) *Attorney, Agent, or Firm*—Innovation Counsel LLP (57) ABSTRACT

To improve reliability of a liquid crystal display apparatus using an upper substrate, the upper substrate to be combined with a lower substrate includes a transparent electrode and a first spacer. The lower substrate includes a display region and a driving region surrounding the display region to provide a drive signal to the display region. A liquid crystal layer is interposed between the upper substrate and the lower substrate. The first spacer is formed on the transparent electrode corresponding to the driving region to protect the driving region. The first spacer is disposed such that a rubbing having a rubbing direction of the upper substrate does not end at the first spacer. Thus, a corner white phenomenon that is caused by impurities stacked at a side portion of the first spacer may be reduced.

21 Claims, 10 Drawing Sheets

SPACER POSITIONING TO IMPROVE DISPLAY QUALITY IN A LIQUID CRYSTAL DISPLAY APPARATUS

CROSS-REFERENCE TO RELATED APPLICATIONS

This application relies for priority upon Korean Patent Application No. 2004-524 filed on Jan. 6, 2004, the contents of which are herein incorporated by reference in its entirety.

BACKGROUND OF THE INVENTION

1. Field of the Invention

The present invention relates to an upper substrate and a liquid crystal display apparatus having the upper substrate. More particularly, the present invention relates to an upper substrate with improved reliability and a liquid crystal display apparatus having the upper substrate.

2. Description of the Related Art

Generally, liquid crystal display apparatuses are classified into a transmissive type liquid crystal display apparatus, a reflective type liquid crystal display apparatus and a transmissive and reflective type liquid crystal display apparatus according to light sources used for the apparatuses. The transmissive type liquid crystal display apparatus displays an image using a backlight disposed in a rear face of a liquid crystal cell. The reflective type liquid crystal display apparatus uses natural light as the light source. The transmissive and reflective type liquid crystal display apparatus is operated either by a transmissive display mode or by a reflective display mode. An image is displayed using a light source built in the liquid crystal display apparatus in the transmissive display mode under indoor or dark conditions where no external light source exists. When illumination is sufficient, external light is reflected on a reflective electrode in the liquid crystal display apparatus to display the image in the reflective display mode.

A liquid crystal display apparatus usually controls an arrangement of liquid crystal molecules in accordance with a voltage applied to a liquid crystal layer. The liquid crystal display apparatus is generally classified into a passive matrix type liquid crystal display apparatus and an active matrix type liquid crystal display apparatus according to a method of operation. In the passive matrix type liquid crystal display apparatus, pixels are operated using a root-mean-square value of a voltage difference between a signal line and a scanning line while applying a signal voltage to all the pixels connected to the scanning line. In the active matrix type liquid crystal display apparatus, each pixel is operated by a switching device such as a thin film transistor or a metal-insulator-metal device.

A process for manufacturing an active matrix type and a transmissive type liquid crystal display apparatus using the thin film transistor includes forming a lower substrate having the thin film transistor and a pixel electrode arranged thereon, forming an upper substrate including a color filter and a common electrode, and forming a liquid crystal layer between the lower and upper substrates.

Figure 1:
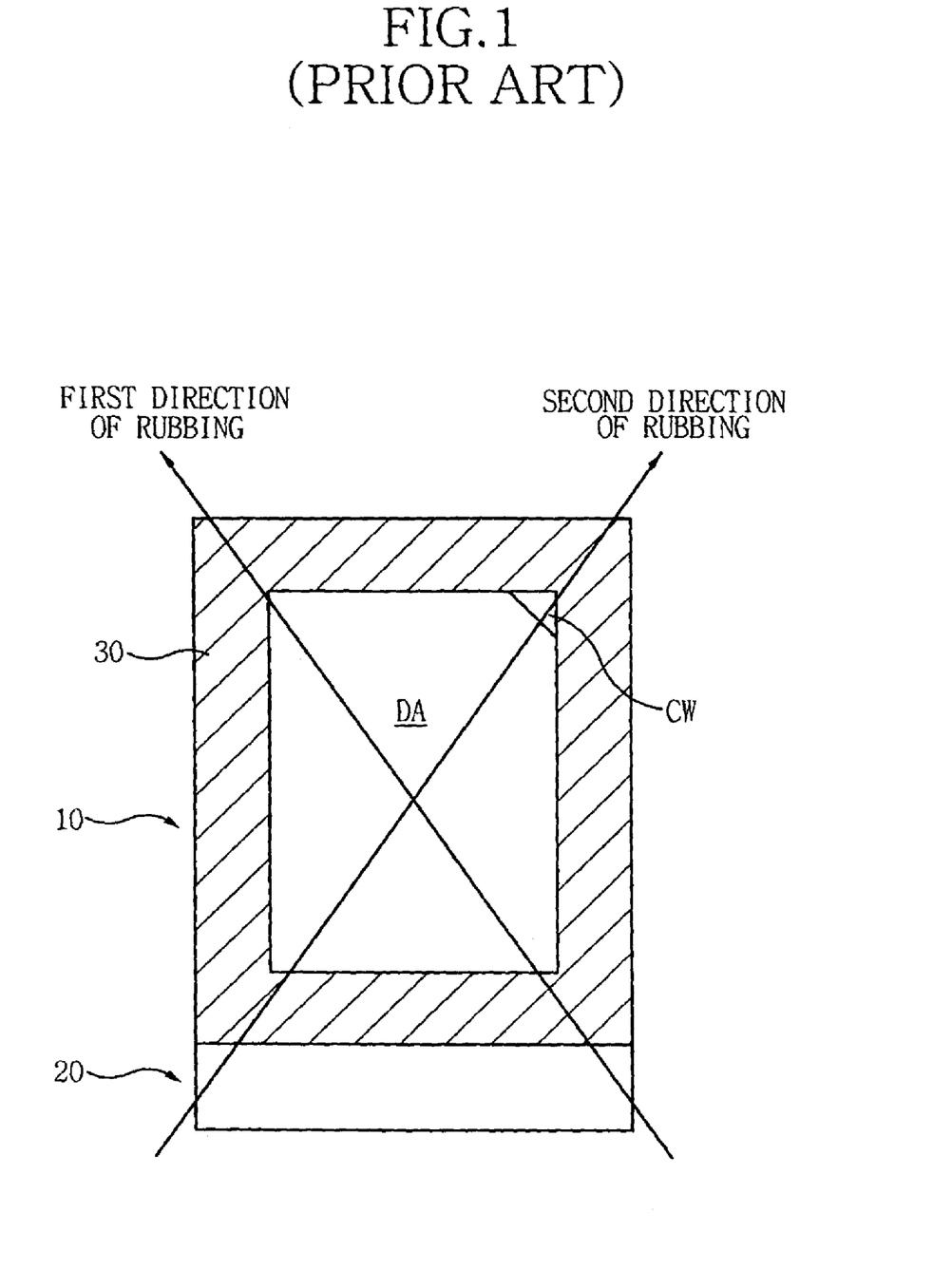
FIG. 1 is a plan view illustrating a conventional transmissive and reflective type liquid crystal display apparatus.

FIG. 1 is a plan view illustrating a conventional transmissive and reflective type liquid crystal display apparatus.

Referring to FIG. 1, the transmissive and reflective type liquid crystal display apparatus operates in a twisted nematic mode in which a first rubbing direction of an upper substrate (or a color filter substrate) 10 is substantially perpendicular to a second rubbing direction of a lower substrate (or a thin film transistor substrate) 20. Conducting a high temperature reliability test at a temperature of about 50 to 60° C. causes inferiority such as a corner white phenomenon. The corner white phenomenon refers to a gray scale changing from medium or black to partially white at a tip of corner of display region DA of the lower substrate 20 along the second rubbing direction.

In a conventional liquid crystal display apparatus, an aperture ratio is increased by superposing a pixel electrode on the data line and on the gate line using an organic insulation layer having a low dielectric constant. The corner white phenomenon may be generated due to impurities caused by the organic insulation layer formed on the lower substrate 20 during rubbing the lower substrate 20. The corner white phenomenon shown at the tip of the lower substrate 20 along the rubbing direction may be prevented by forming a dummy pixel region near the display region DA, thereby shifting a position of a corner white CW toward the black matrix 30.

A conventional transmissive and reflective type liquid crystal display apparatus usually has constant cell gaps in the transmissive mode and in the reflective mode. Since the cell gap is determined based on either the transmissive mode or the reflective mode, a significant difference in image characteristics such as color reproduction may be generated due to an optical path difference between the transmitting light and the reflecting light when the apparatus is used. Thus, a liquid crystal display apparatus having a double cell gap has been developed. A thickness of liquid crystal layer in the transmissive mode is thicker than that of liquid crystal layer in the reflective mode to compensate a transmissivity difference between the reflective mode and the transmissive mode.

Furthermore, technologies of integrating a gate driver circuit and/or a data driver circuit on the lower substrate of the liquid crystal display apparatus have been developed to simplify assembly processes and to reduce size and volume of the liquid crystal display apparatus.

Figure 2:
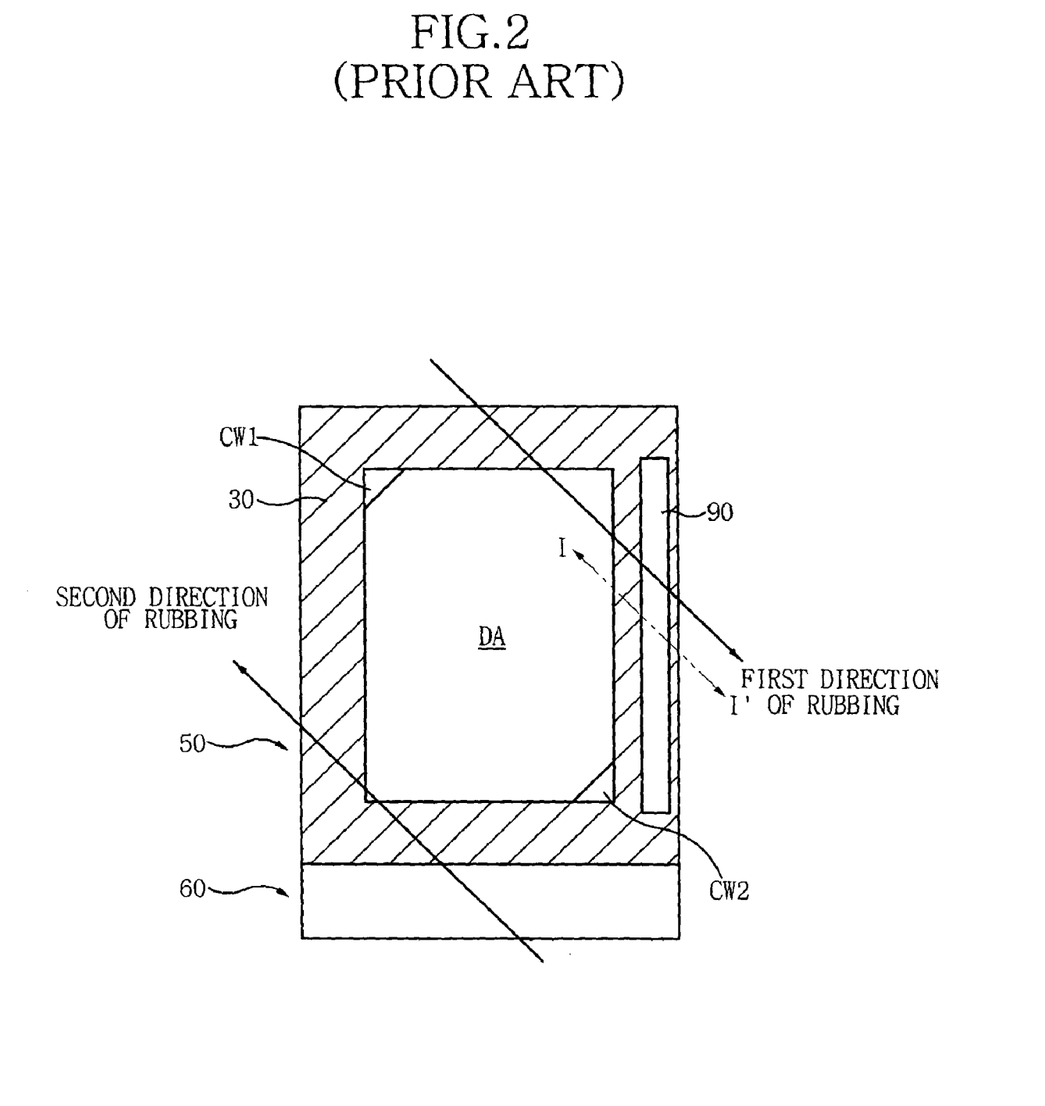
FIG. 2 is a plan view illustrating a liquid crystal display apparatus having a double cell gap with driver circuits integrated thereon.
Figure 3:
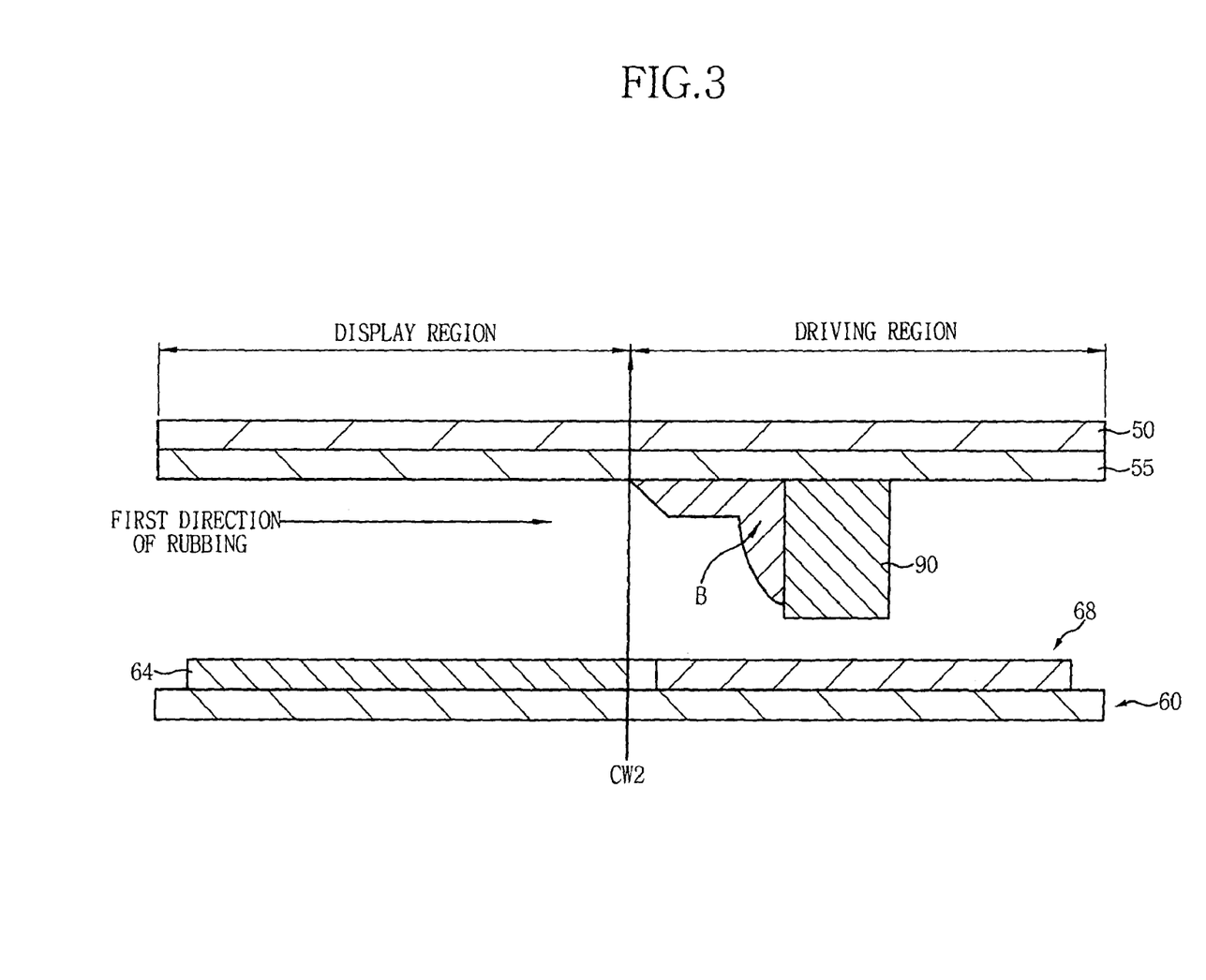
FIG. 3 is a cross-sectional view taken along a line I-I' of FIG. 2.

FIG. 2 is a plan view illustrating a liquid crystal display apparatus having a double cell gap with driver circuits integrated thereon. FIG. 3 is a cross-sectional view taken along a line I-I' of FIG. 2.

Referring to FIGS. 2 and 3, a lower substrate 60 has a display region DA and a driving region DR. Thin film transistors are formed in the display region DA, and a gate driver circuit 68 and/or a data driver circuit (not shown) that operates the thin film transistors is/are formed in the driving region DR. In FIGS. 2 and 3, the thin film transistors, the pixel electrode and other elements formed in the display region of the lower substrate 60 are represented by a reference numeral 64 and positions thereof are omitted.

A spacer (not shown) that separates the upper substrate 50 from the lower substrate 60 by a specific distance to maintain a cell gap is formed on a common electrode 55 corresponding to the display region DA of the upper substrate 50. A capping spacer 90 is formed on the common electrode 55 corresponding to the driving region DR of the upper substrate 50 to improve the reliability of the gate driver circuit 68.

Molecules of liquid crystal is homogeneously arranged in the transmissive and reflective type liquid crystal display apparatus having a double cell gap to set a twist angle of the liquid crystal to be zero. To set the twist angle of the liquid crystal to be zero, the upper substrate 50 is rubbed along a first rubbing direction and the lower substrate 60 is preferably rubbed along a second rubbing direction that is anti-parallel to the first rubbing direction.

A high temperature reliability test conducted at a temperature of about 50 to 60° C. on the transmissive and reflective type liquid crystal display apparatus corresponding to an electrically controlled birefringence mode, in which the first rubbing direction of the upper substrate 50 is anti-parallel with the second rubbing direction of the lower substrate 60, induces a corner white phenomenon CW1 at the tip of corner of the display region DA along the second rubbing direction as well as a corner white phenomenon CW2 at the tip of corner of the upper substrate 250 along the first rubbing direction.

The corner white phenomenon CW2 at the tip of corner of the upper substrate 50 along the first rubbing direction is caused by the capping spacer 90 formed on the upper substrate 50. Impurities 'B' caused by rubbing are stacked at side portion of the capping spacer 90 while the capping spacer 90 that improves the reliability of the gate driver circuit 68 formed on the lower substrate 60 makes contact with the upper substrate 50 along the first rubbing direction. The impurities 'B' cause the corner white phenomenon CW2 to deteriorate the reliability of the liquid crystal display apparatus.

SUMMARY OF THE INVENTION

Accordingly, the present invention is provided to substantially obviate one or more problems due to limitations and disadvantages of the related art.

The present invention provides an upper substrate used in a liquid crystal display apparatus with increased reliability.

The present invention also provides a liquid crystal display apparatus with increased reliability and reduced corner white phenomena.

In an exemplary upper substrate according to the present invention, the upper substrate to be combined with a lower substrate includes a transparent electrode and a first spacer. The lower substrate includes a display region and a driving region surrounding the display region to provide a drive signal to the display region. A liquid crystal layer is interposed between the upper substrate and the lower substrate. The first spacer is disposed such that a rubbing having a rubbing direction of the upper substrate does not end at the first spacer. The rubbing direction of the upper substrate is substantially perpendicular to a rubbing direction of the lower substrate. Alternatively, the rubbing direction of the upper substrate is opposite to a rubbing direction of the lower substrate.

In an exemplary liquid crystal display apparatus according to the present invention, the liquid crystal display apparatus includes a lower substrate, an upper substrate and a liquid crystal layer interposed between the upper substrate and the lower substrate. The lower substrate includes a display region and a driving region. The driving region surrounds the display region to provide a drive signal to the display region. The upper substrate includes a common electrode and a first spacer.

The first spacer is disposed such that a rubbing having a rubbing direction of the upper substrate does not end at the first spacer.

In a transmissive and reflective type liquid crystal display apparatus according to the present invention, the transmissive and reflective type liquid crystal display apparatus includes a lower substrate, an upper substrate and a liquid crystal layer interposed between the upper substrate and the lower substrate. The lower substrate includes a display region and a driving region. The display region has a transmission window and a reflection window. The driving region surrounds the display region to provide a drive signal to the display region. The upper substrate includes a common electrode and a first spacer. The first spacer is disposed such that a rubbing having a rubbing direction of the upper substrate does not end at the first spacer.

According to the present invention, a first spacer is disposed such that a rubbing having a rubbing direction of an upper substrate does not end at the first spacer.

Thus, a corner white phenomenon that is caused by impurities stacked at side portion of the first spacer in the display region may be reduced, and the reliability of the liquid crystal display apparatus may be increased.

BRIEF DESCRIPTION OF THE DRAWINGS

The above and other features and advantages of the invention will become more apparent by describing in detailed exemplary embodiments thereof with reference to the accompanying drawings, in which.

DESCRIPTION OF THE PREFERRED EMBODIMENTS

Hereinafter, the preferred embodiment of the invention will be described in detail with reference to the accompanying drawings.

Figure 4:
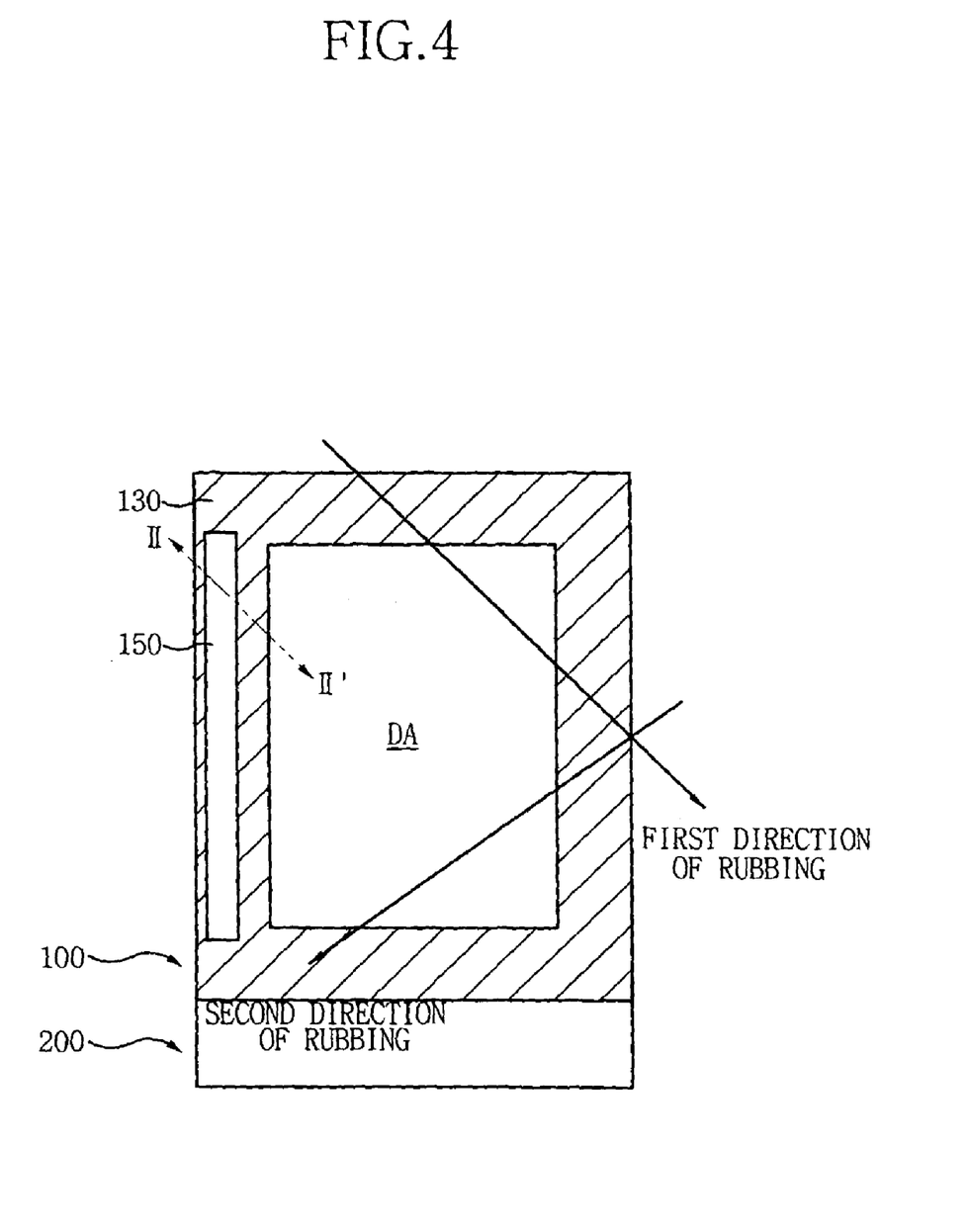
FIG. 4 is a plan view illustrating a liquid crystal display apparatus according to an exemplary embodiment of the present invention.
Figure 5:
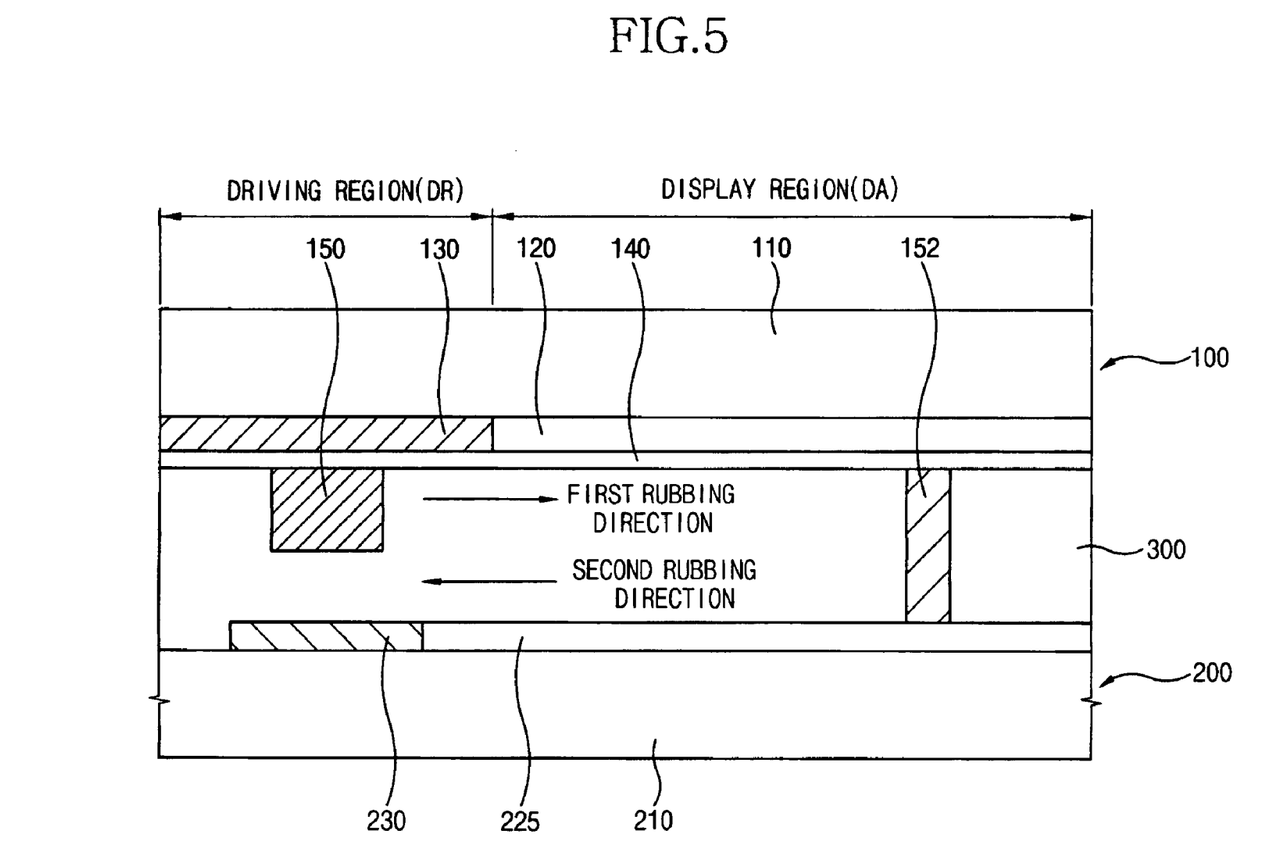
FIG. 5 is a cross-sectional view taken along a line II-II' of FIG. 4.
Figure 6:
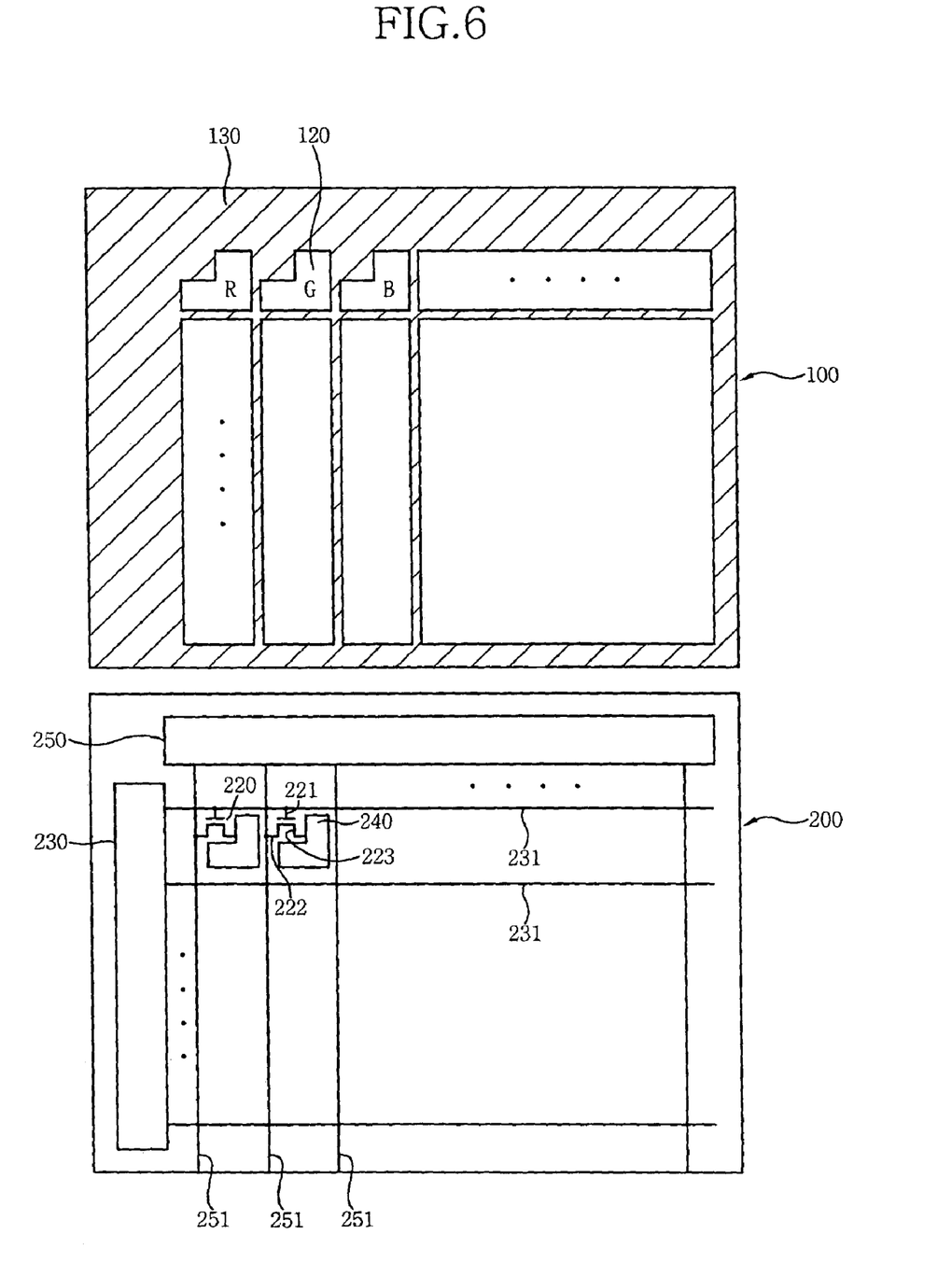
FIG. 6 is a schematic plan view respectively illustrating the upper substrate and the lower substrate shown in FIG. 5.

FIG. 4 is a plan view illustrating a liquid crystal display apparatus according to an exemplary embodiment of the present invention. FIG. 5 is a cross-sectional view taken along a line II-II' of FIG. 4. FIG. 6 is a schematic plan view respectively illustrating the upper substrate and the lower substrate shown in FIG. 5.

Referring to FIGS. 4 to 6, the liquid crystal display apparatus includes an upper substrate 100, a lower substrate 200 and a liquid crystal layer 300 interposed between the upper substrate 100 and the lower substrate 200. A display region DA and a driving region DR are defined on the lower substrate 200. The driving region DR surrounds the display region DA, and provides a drive signal to the display region DA.

The upper substrate 100 includes a first insulation plate 110, a color filter 120, a black matrix 130 and a common electrode 140.

Each color filter 120 has a red, green or blue color pixel. Each color pixel shows a red, green or blue color by light. The black matrix 130 distinguishes each color pixel. The black matrix 130 prevents a light leakage occurring at near boundaries of color pixels. The black matrix 130 also blocks unnecessary light from another region other than the display region DA. The common electrode 140 includes a transparent material such as indium tin oxide (ITO), indium zinc oxide (IZO), etc.

The lower substrate 200 includes a second insulation plate 210, a plurality of pixels 225, a gate driver circuit 230 and a data driver circuit 250. The pixels 225 are formed in the display region DA in a shape of matrix, and the gate driver circuit 230 and the data driver circuit 250 are formed in the driving region DR.

Each of the pixels 225 includes a gate line 231, a data line 251 that is substantially perpendicular to the gate line 231, a thin film transistor 220 connected to the gate line 231 and the data line 251 as a switching device, and a pixel electrode 240 connected to the thin film transistor 220.

A gate electrode 221 of the thin film transistor 220 is connected to the gate line 231, and a source electrode 222 of the thin film transistor 220 is connected to the data line 251. A drain electrode 223 of the thin film transistor 220 is connected to the pixel electrode 240.

When electrical signals are externally provided to the gate driver circuit 230 and the data driver circuit 250, the gate driver circuit 230 sequentially applies a gate driving voltage that is suitable for driving the thin film transistor 220 to each of the gate lines 231. When the gate driving voltage sequentially drives each of the thin is film transistors 220, an image signal outputted from the data driver circuit 250 is provided to the data line 251. The image signal is then provided to the pixel electrode 240 connected to the thin film transistor 220 driven by the gate driving voltage. Accordingly, an electric field is generated between the common electrode 140 on the upper substrate 100 and the pixel electrode 240 on the lower substrate 200.

A member that maintains a cell gap (hereinafter, referred to as spacers) is formed between the upper substrate 100 and the lower substrate 200.

The spacers maintain the cell gap to prevent the liquid crystal between the upper and lower substrates 100 and 200 from deformation in shape and property. In addition, the spacers prevent deterioration of the display quality of the liquid crystal display apparatus. The spacers are preferably formed on a position corresponding to a non-effective display region so that the aperture ratio that indicates an effective display region/total region is not affected. In this embodiment, the non-effective display region corresponds to the driving region DR as well as a region having the thin film transistor 220, the gate line 231 and the data line 251.

The spacers are classified into a ball spacer and a rigid spacer. The ball spacer has a shape of ball, and a plurality of the ball spacers is scattered on the upper substrate 100 or the lower substrate 200. The rigid spacer is formed by forming an organic layer on the upper substrate 100 or the lower substrate 200 and then patterning the organic layer.

Since the ball spacers tend to be randomly scattered, the ball spacers may be formed on an effective display region of the liquid crystal display apparatus, thereby reducing the aperture ratio. The ball spacer also has an irregular size, thereby failing in maintaining a constant cell gap.

The rigid spacer is formed on the non-effective display region by selectively removing the organic layer on the other region other than the non-effective display region. In addition, use of the rigid spacer may not decrease the aperture ratio while maintaining a constant cell gap.

In the present embodiment, spacers include a first spacer 150 and a second spacer 152. The first spacer 150 is formed on the common electrode 140 of the upper substrate 100 corresponding to the driving region DR. The second spacer 152 is formed on a region corresponding to the non-effective display region in the display region DA. The second spacer 152 is formed from a layer forming the first spacer. The second spacer 152 maintains a distance between the upper substrate 100 and the lower substrate 200.

When only the second spacer 152 is formed, a parasitic capacitance may be generated between the gate driver circuit 230 and the common electrode 140. Hence, the signal outputted from the gate driver circuit 230 is possibly distorted or delayed to deteriorate the display quality of the liquid crystal display apparatus. Additionally, when an external impact is applied to the liquid crystal display apparatus, the common electrode 140 formed on the upper substrate 100 may be contacted with the gate driver circuit 230 formed on the lower substrate 200 to cause an electrical short between the upper substrate 100 and the lower substrate 200. The first spacer 150 formed on a position corresponding to the driving region DR may protect the gate driver circuit 230 from the external impact. Moreover, the parasitic capacitance between the common electrode 140 and the gate driver circuit 230 may be reduced to improve the reliability of the gate driver circuit 230.

The first spacer 150 preferably has a bar-shape that corresponds to the shape of the gate driver circuit 230. The second spacer 152 is formed in a bar-shape that corresponds to the black matrix 130 formed on the display region DA of the upper substrate 100. Alternatively, the first and second spacers 150 and 152 may have a dot shape such as cylinder, rectangular prism or triangular prism.

In this embodiment, the position of the first spacer 150 is controlled so that a rubbing having the first rubbing direction of the upper substrate 100 does not end at the first spacer 150.

The first rubbing direction that corresponds to the rubbing direction of the upper substrate 100 is required to be substantially perpendicular to the second rubbing direction that corresponds to the rubbing direction of the lower substrate 200 in order to arrange the liquid crystal to have a twist angle. The first spacer 150 is preferably disposed on a left side of the upper substrate 100 in a plan view thereof such that the rubbing having the first rubbing direction of the upper substrate 100 does not end at the first spacer 150. When the rubbing having the first rubbing direction of the upper substrate 100 ends at the first spacer 150, impurities caused by the rubbing may be stacked at the side portion of the first spacer 150 toward the black matrix 130. Thus, when the rubbing having the first rubbing direction of the upper substrate 100 does not end at the first spacer 150, the impurities may not be stacked at the side portion of the first spacer 150 toward the display region DA, thereby preventing the corner white phenomenon.

Hereinafter, processes of manufacturing the above described upper substrate 100 and the lower substrate 200 will be described in detail.

A first photoresist layer (not shown) including a red pigment or dye is coated on a first insulation plate 110. A first mask (not shown) is disposed over the first photoresist layer. The first mask has patterns corresponding to a shape of a red color pixel on the first insulation plate 110.

The first photoresist layer is exposed and then developed to remove the exposed photoreisist layer.

A second photoresist layer (not shown) including a green pigment or dye is coated on a region other than the region having the red color pixel of the first insulation plate 110. A procedure of preparing the red color pixel is repeated to form a green color pixel. A third photoresist layer (not shown) including a blue pigment or dye is coated on a region other than the region having the red color pixel and the green color pixel of the first insulation plate 110. A procedure of preparing the red color pixel or the green color pixel is repeated to form a blue color pixel. As a result, a color filter 120 having red, green and blue color pixels is formed on the first insulation plate 110.

A black matrix 130 is formed on the first insulation plate 110 having the color filter 120 formed thereon. The black matrix 130 is formed between two of the red, green and blue color pixels. The black matrix 130 blocks light leaked from the red, green and blue color pixels to improve a contrast ratio. The black matrix 130 is formed in the driving region DR as well as in the display region DA to prevent the gate driver circuit 230 and the data driver circuit 250 from being projected in a screen of the liquid crystal display apparatus. The black matrix 130 includes chromium oxide or an organic material.

The common electrode 140 including ITO or IZO is formed on the first insulation plate 110 having the color filter 120 and the black matrix 130 formed thereon. An organic layer is then formed on the first insulation plate 110 having the common electrode 140.

A second mask (not shown) having patterns corresponding a shape of a second spacer 152 is disposed over the organic layer. The organic layer is exposed and then developed to form a first spacer 150 in the driving region DR, and the second spacer 152 in the display region DA. The first spacer 150 preferably has a height less than that of the second spacer 152, wherein the height is measured from the bottom of the first insulation plate 110.

A plurality of pixels 225 including a thin film transistor 220 and a pixel electrode 240 is formed in the display region DA of the lower substrate 200. During a formation of the thin film transistor 220, a plurality of gate lines 231 is formed along a row direction, and a plurality of data lines 251 is formed along a column direction. A gate driver circuit 230 and a data driver circuit 250 are formed in the driving region DA to drive the thin film transistor 220 during the formation of the thin film transistor 220.

An organic insulation layer (not shown) is formed on the second insulation plate 210 having the thin film transistor 220, the gate driver circuit 230 and the data driver circuit 250 formed thereon. The organic insulation layer formed on a position corresponding to a drain electrode 223 is removed to form a contact hole (not shown). A transparent conductive layer including ITO or IZO and a reflective layer including chromium (Cr), molybdenum (Mo), aluminum neodymium (AlNd), copper (Cu) or alloys thereof are sequentially formed on the organic insulation layer and in the contact hole. The transparent conductive layer and the reflective layer are patterned by a photolithography process to form a pixel electrode 240 that is electrically connected to the drain electrode 223 of the thin film transistor 220 through the contact hole. The pixel electrode 240 includes a transparent electrode and a reflective electrode. Portions of the reflective electrode are superposed on the transparent electrode to form a transmission window and a reflection window.

The upper substrate 100 is combined with the lower substrate 200 so that the common electrode 140 faces to the pixel electrode 240. In particular, a sealant is formed near the display region DA to firmly combine the upper substrate 100 with the lower substrate 200.

The first spacer 150 formed on the upper substrate 100 protects the gate driver circuit 230 formed on the lower substrate 200. The second spacer 152 is contacted with the lower substrate 200 to maintain the cell gap between the upper substrate 100 and the lower substrate 200.

Liquid crystal is interposed between the upper and lower substrates 100 and 200 to form a liquid crystal layer 300, thereby completing a liquid crystal display apparatus.

Figure 7:
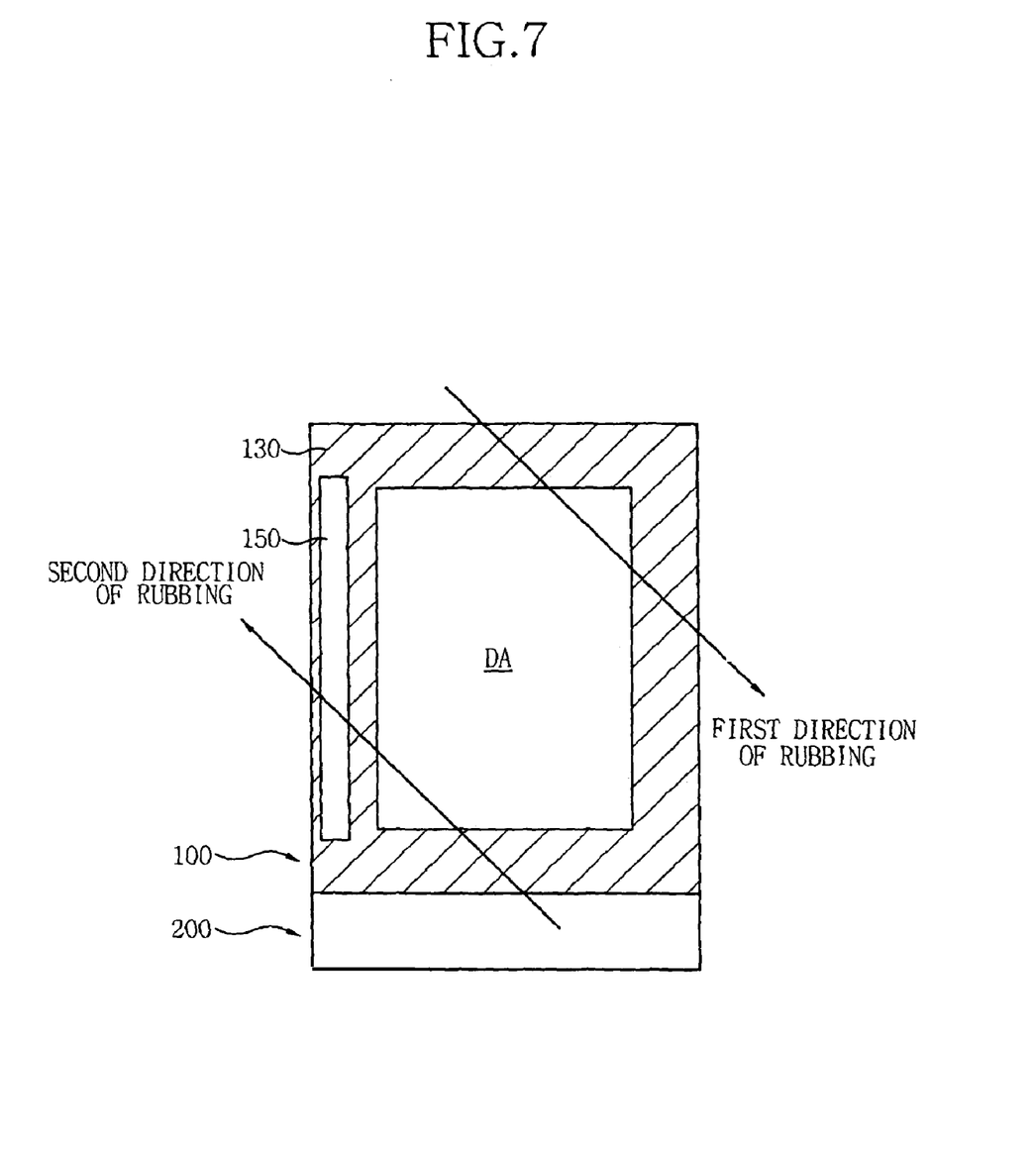
FIG. 7 is a plan view illustrating a liquid crystal display apparatus according to another exemplary embodiment of the present invention.

FIG. 7 is a plan view illustrating a liquid crystal display apparatus according to another exemplary embodiment of the present invention. Directions in this embodiment will be described in the plan view.

Referring to FIG. 7, when a transmissive and reflective type liquid crystal display apparatus employs a homogenous liquid crystal alignment mode instead of a twisted liquid crystal alignment mode to improve transmissivity, a cell gap in the reflection region is preferably different from the cell gap in the transmitting region. Accordingly, in the homogenous liquid crystal alignment mode, the liquid crystal layer between the upper and lower substrates 100 and 200 in the reflection region preferably has a thickness different from that of the transmitting region.

The upper substrate 100 is preferably rubbed along a first rubbing direction and the lower substrate 200 is preferably rubbed along a second rubbing direction that is opposite to the first rubbing direction to set a twisted angle at zero.

When the upper substrate 100 is rubbed along a first rubbing direction that corresponds to a four o'clock direction and the lower substrate 200 is rubbed along a ten o'clock direction that is opposite to the first rubbing direction, the first spacer 150 that is to be formed on the upper substrate 100 corresponding to the driving region DR of the lower substrate 200 is placed on a left side of the upper substrate 100 so that a rubbing having the first rubbing direction of the upper substrate 100 does not end at the first spacer 150. Thus, impurities may not be stacked at a side portion of the first spacer 150 toward the display region DA to prevent a corner white phenomenon.

Figure 8:
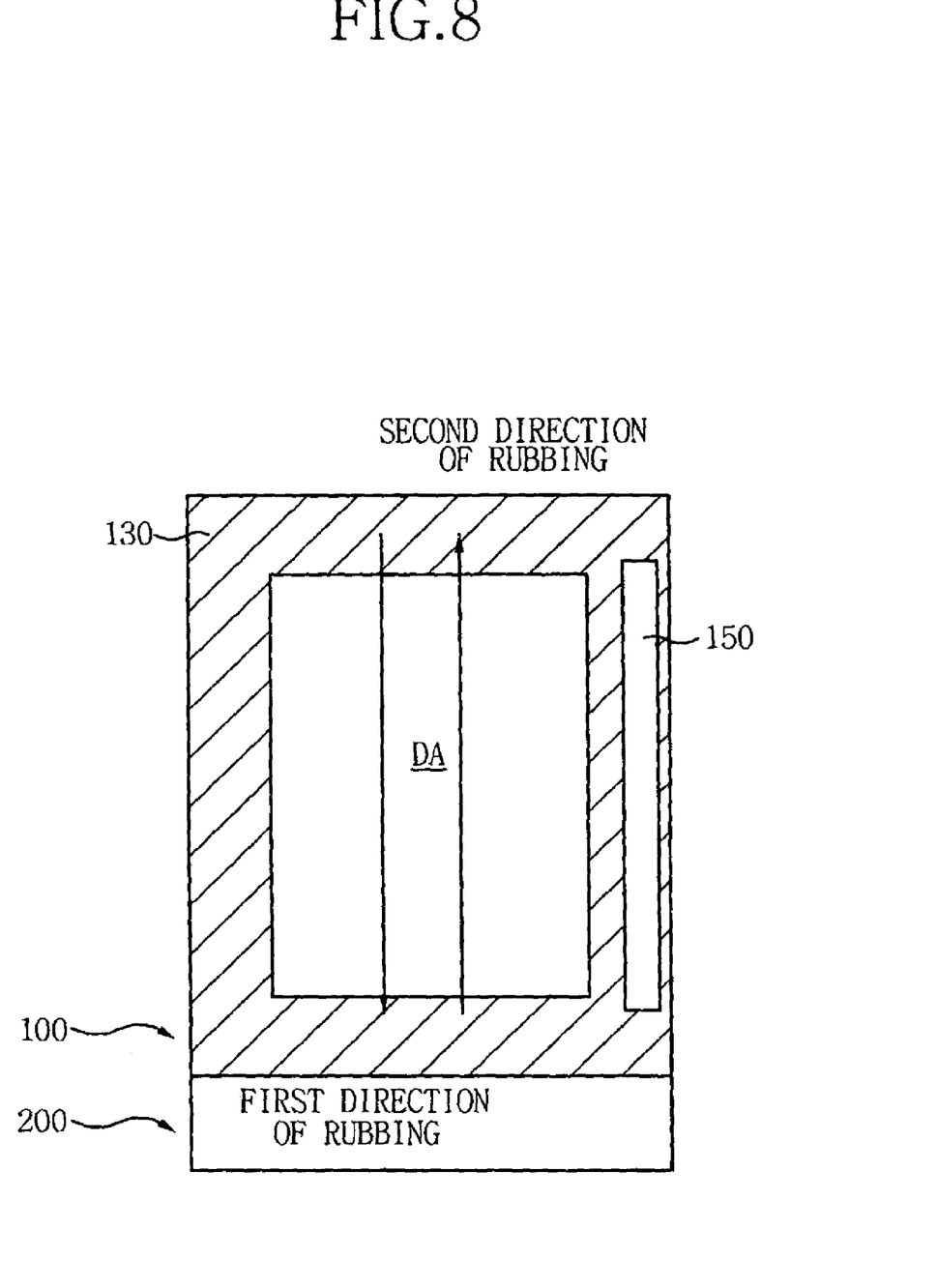
FIG. 8 is a plan view illustrating a liquid crystal display apparatus according to still another exemplary embodiment of the present invention.

FIG. 8 is a plan view illustrating a liquid crystal display apparatus according to still another exemplary embodiment of the present invention. Directions in this embodiment will be described in terms of the plan view.

Referring to FIG. 8, the upper substrate 100 is rubbed along a first rubbing direction, and the lower substrate 200 is rubbed along a second rubbing direction that is opposite to the first rubbing direction to set the twist angle of liquid crystal at zero in a transmissive and reflective type liquid crystal display apparatus having a double cell gap. To reduce a rubbing effect, it is advantageous to employ a viewing angle in a twelve o'clock direction or six o'clock direction.

For example, when the lower substrate 200 is rubbed along the second rubbing direction that is a twelve o'clock direction, and the upper substrate 100 is rubbed along the first rubbing direction that is a six o'clock direction opposite to the second rubbing direction, a rubbing having the first rubbing direction of the upper substrate 100 does not end at the first spacer 150 on the upper substrate 100 corresponding to the driving region DA of the lower substrate. Therefore, the spacer 150 may be placed at any position on the upper substrate 100.

Figure 9:
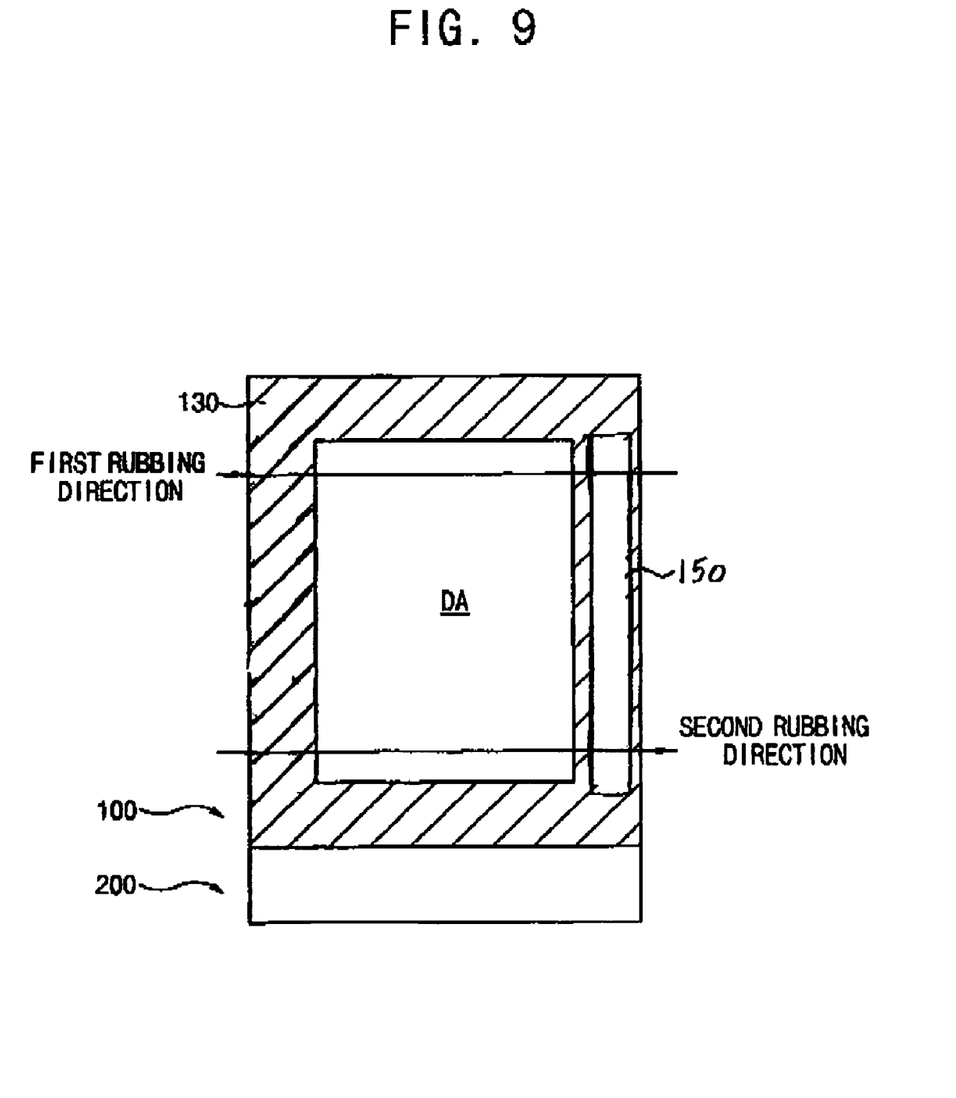
FIG. 9 is a plan view illustrating a liquid crystal display apparatus according to still another exemplary embodiment of the present invention.

FIG. 9 is a plan view illustrating a liquid crystal display apparatus according to still another exemplary embodiment of the present invention. Directions in this embodiment will be described in terms of the plan view.

Referring to FIG. 9, the lower substrate 200 is rubbed along a first rubbing direction that is a nine o'clock direction, and the upper substrate 100 is rubbed along a second rubbing direction that is a three o'clock direction, to set a main viewing angle in a three o'clock direction. The first spacer 150 corresponding the position of the driving region DA of the lower substrate 200 is disposed on a left side of the upper substrate 100 such that a rubbing having the second rubbing direction of the upper substrate 100 does not end at the first spacer 150.

Since the rubbing having the first rubbing direction of the upper substrate 100 is performed as in contact with the first spacer 150 toward the black matrix 130, impurities caused by the rubbing may be stacked at the side portion of the first spacer 150 toward the black matrix 130, for example at the right side in the plan view. The impurities are not stacked at the left side portion of the first spacer 150 toward the display region DA, thereby preventing the corner white phenomenon.

Figure 10:
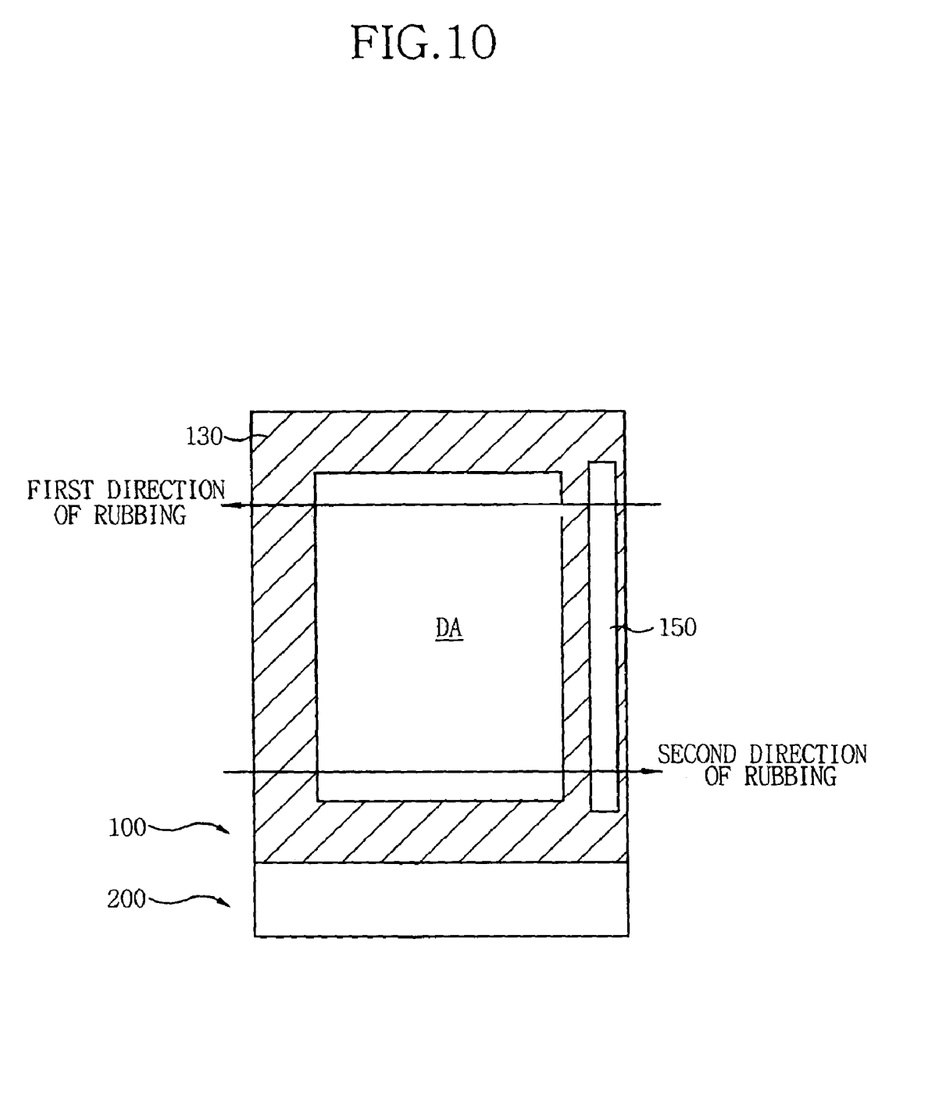
FIG. 10 is a plan view illustrating a liquid crystal display apparatus according to still another exemplary embodiment of the present invention.

FIG. 10 is a plan view illustrating a liquid crystal display apparatus according to still another exemplary embodiment of the present invention. Directions in this embodiment will be described in terms of the plan view.

Referring to FIG. 10, the lower substrate 200 is rubbed along a second rubbing direction that is a three o'clock direction, and the upper substrate 100 is rubbed along a first rubbing direction that is a nine o'clock direction, to set a main viewing angle in a nine o'clock direction. The first spacer 150 corresponding the position of the driving region DA of the lower substrate 200 is disposed on a right side of the upper substrate 100 so that a rubbing having the first rubbing direction of the upper substrate 100 does not end at the first spacer 150.

Since the rubbing having the first rubbing direction of the upper substrate 100 is performed as in contact with the first spacer 150 toward the black matrix 130, impurities caused by the rubbing may be stacked at the side portion of the first spacer 150 toward the black matrix 130, for example at a left side in the plan view. The impurities are not stacked at a right side portion of the first spacer 150 toward the display region DA, thereby preventing the corner white phenomenon.

As described above, the first spacer 150 is disposed on the upper substrate 100 so that the rubbing having the first rubbing direction of the upper substrate 100 does not end at the first spacer 150.

Thus, a corner white phenomenon that is caused by impurities stacked at the side portion of the first spacer in the display region DA may be reduced, and the reliability of the liquid crystal display apparatus may be increased.

Having described the exemplary embodiments of the invention and its advantages, it is noted that various changes, substitutions and alterations can be made herein without departing from the spirit and scope of the invention as defined by appended claims.

What is claimed is:

1. An upper substrate to be combined with a lower substrate including a display region and a driving region surrounding the display region to provide a drive signal to the display region, a liquid crystal layer being interposed between the upper substrate and the lower substrate, the driving region making contact with sides of the upper substrate, comprising:
   a transparent electrode; and
   a first spacer disposed in the driving region,
   wherein a rubbing direction of the upper substrate is antiparallel with a rubbing direction of the lower substrate, and
   wherein the first spacer has a bar shape extending in a direction substantially parallel with the rubbing directions of the upper and the lower substrates, and
   wherein the first spacer is formed on the transparent electrode in a position corresponding to a driver circuit.

2. The upper substrate of claim 1, wherein the first spacer is formed on the transparent electrode corresponding to the driving region.

3. The upper substrate of claim 1, further comprising a second spacer formed on the transparent electrode corresponding to the display region to maintain a distance between the upper substrate and the lower substrate, the first and second spacers being formed by patterning a same layer.

4. The upper substrate of claim 1, wherein the rubbing direction of the upper substrate is opposite to the rubbing direction of the lower substrate.

5. A liquid crystal display apparatus comprising:
   a lower substrate including a display region and a driving region that surrounds the display region to provide a drive signal to the display region;
   an upper substrate including a common electrode and a first spacer disposed in the driving region, sides of the upper substrate making contact with the driving region of the lower substrate; and
   a liquid crystal layer interposed between the upper substrate and the lower substrate,
   wherein a rubbing direction of the upper substrate is antiparallel with a rubbing direction of the lower substrate, and
   wherein the first spacer has a bar shape extending in a direction substantially parallel with the rubbing directions of the upper and the lower substrates, and
   wherein the first spacer is formed on the common electrode in a position corresponding to a driver circuit.

6. The liquid crystal display apparatus of claim 5, wherein the first spacer is formed on the common electrode corresponding to the driving region.

7. The liquid crystal display apparatus of claim 5, further comprising a second spacer formed on a transparent electrode corresponding to the display region to maintain a distance between the upper substrate and the lower substrate, the first and second spacers being formed by patterning a same layer.

8. The liquid crystal display apparatus of claim 5, wherein the rubbing direction of the upper substrate is opposite to the rubbing direction of the lower substrate.

9. The liquid crystal display apparatus of claim 5, wherein when the rubbing direction of the lower substrate corresponds to a twelve o'clock or six o'clock direction and the rubbing direction of the upper substrate is opposite to the rubbing direction of the lower substrate, the first spacer is disposed at a right or left side in the display region of the upper substrate.

10. The liquid crystal display apparatus of claim 5, wherein the lower substrate comprises:
    a gate line;
    a data line that is substantially perpendicular to the gate line;
    a switching device connected to the gate line and the data line;
    a pixel electrode connected to the switching device.

11. The liquid crystal display apparatus of claim 10, wherein the pixel electrode includes a transparent electrode and a reflective electrode, the reflective electrode being superposed on the transparent electrode to form a transmission window and a reflection window.

12. The liquid crystal display apparatus of claim 11, wherein the liquid crystal layer has a different thickness thicknesses on the transmission window and on the reflection window, respectively.

13. A transmissive and reflective type liquid crystal display apparatus comprising:
    a lower substrate including a display region that has a transmission window and a reflection window, and a driving region that surrounds the display region to provide a drive signal to the display region;

an upper substrate including a common electrode and a first spacer that is disposed in the driving region, sides of the upper substrate making contact with the driving region of the lower substrate; and a liquid crystal layer interposed between the upper substrate and the lower substrate, wherein a rubbing direction of the upper substrate is antiparallel with a rubbing direction of the lower substrate, and wherein the first spacer has a bar shape extending in a direction substantially parallel with the rubbing directions of the upper and the lower substrates, and wherein the first spacer is formed on the common electrode in a position corresponding to a driver circuit.

14. The transmissive and reflective type liquid crystal display apparatus of claim 13, wherein the first spacer is formed on the common electrode corresponding to the driving region.

15. The transmissive and reflective type liquid crystal display apparatus of claim 13, further comprising a second spacer formed on a transparent electrode corresponding to the display region to maintain a distance between the upper substrate and the lower substrate, the first and second spacers being formed by patterning a same layer.

16. The transmissive and reflective type liquid crystal display apparatus of claim 13, wherein the rubbing direction of the upper substrate is opposite to the rubbing direction of the lower substrate.

17. The transmissive and reflective type liquid crystal display apparatus of claim 13, wherein when the rubbing direction of the lower substrate corresponds to a twelve o'clock or six o'clock direction and the rubbing direction of the upper substrate is opposite to the rubbing direction of the lower substrate, the first spacer is disposed at a right or left side in the display region of the upper substrate.

18. The transmissive and reflective type liquid crystal display apparatus of claim 13, wherein the liquid crystal layer has a different thicknesses on the transmission window and on the reflection window.

19. The upper substrate of claim 1, wherein the first spacer extends in a direction substantially parallel to the rubbing direction.

20. The upper substrate of claim 1, wherein a switching device and a pixel electrode are disposed in the display region.

21. The liquid crystal display apparatus of claim 10, wherein the switching device and the pixel electrode are disposed in the display region.

* * * * *